United States Patent [19]

Hoffman

[11] 4,092,458

[45] May 30, 1978

[54] POROUS LAMINAR PELLETS OF WASTE POLY(ETHYLENE TEREPHTHALATE) FILM, AND PROCESSES FOR DRYING AND POLYMERIZATION

[75] Inventor: Frank Edward Hoffman, Circleville, Ohio

[73] Assignee: E. I. Du Pont de Nemours and Company, Wilmington, Del.

[21] Appl. No.: 676,141

[22] Filed: Apr. 12, 1976

Related U.S. Application Data

[63] Continuation-in-part of Ser. No. 577,848, May 15, 1975, abandoned.

[51] Int. Cl.² .......................... B32B 5/16; C08J 11/04
[52] U.S. Cl. .................................... 428/402; 260/2.3; 260/75 T; 264/140
[58] Field of Search .............. 260/2.3, 75 T; 428/402, 428/407; 264/140, 141, 142

[56] References Cited

U.S. PATENT DOCUMENTS

| | | | |
|---|---|---|---|
| 3,535,408 | 10/1970 | Ronden | 264/37 |
| 3,767,601 | 10/1973 | Knox | 260/2.3 |
| 3,804,811 | 4/1974 | Rose et al. | 260/2.3 X |
| 3,840,632 | 10/1974 | Maxion et al. | 260/75 M X |
| 3,949,039 | 4/1976 | Yamamoto et al. | 264/142 |

OTHER PUBLICATIONS

*Modern Plastics*, Jun. 1964, p. 54.

*Primary Examiner*—Walter C. Danison

[57] ABSTRACT

Porous laminar pellets of comminuted crystalline poly(ethylene terephthalate) waste film are formed. The pellets do not contain a binder, but are coherent since the polymer flakes making up the pellets are mechanically interlocked or intertwined. Rapid drying and solid state polymerization rates are achieved, and the pellets have sufficient structural integrity to survive such processes, but may be readily disintegrated upon completion of such processes if so desired. The pellets are also well adapted for dissolution, such as in glycol monomer for glycolysis, and in molten polymer.

5 Claims, 3 Drawing Figures

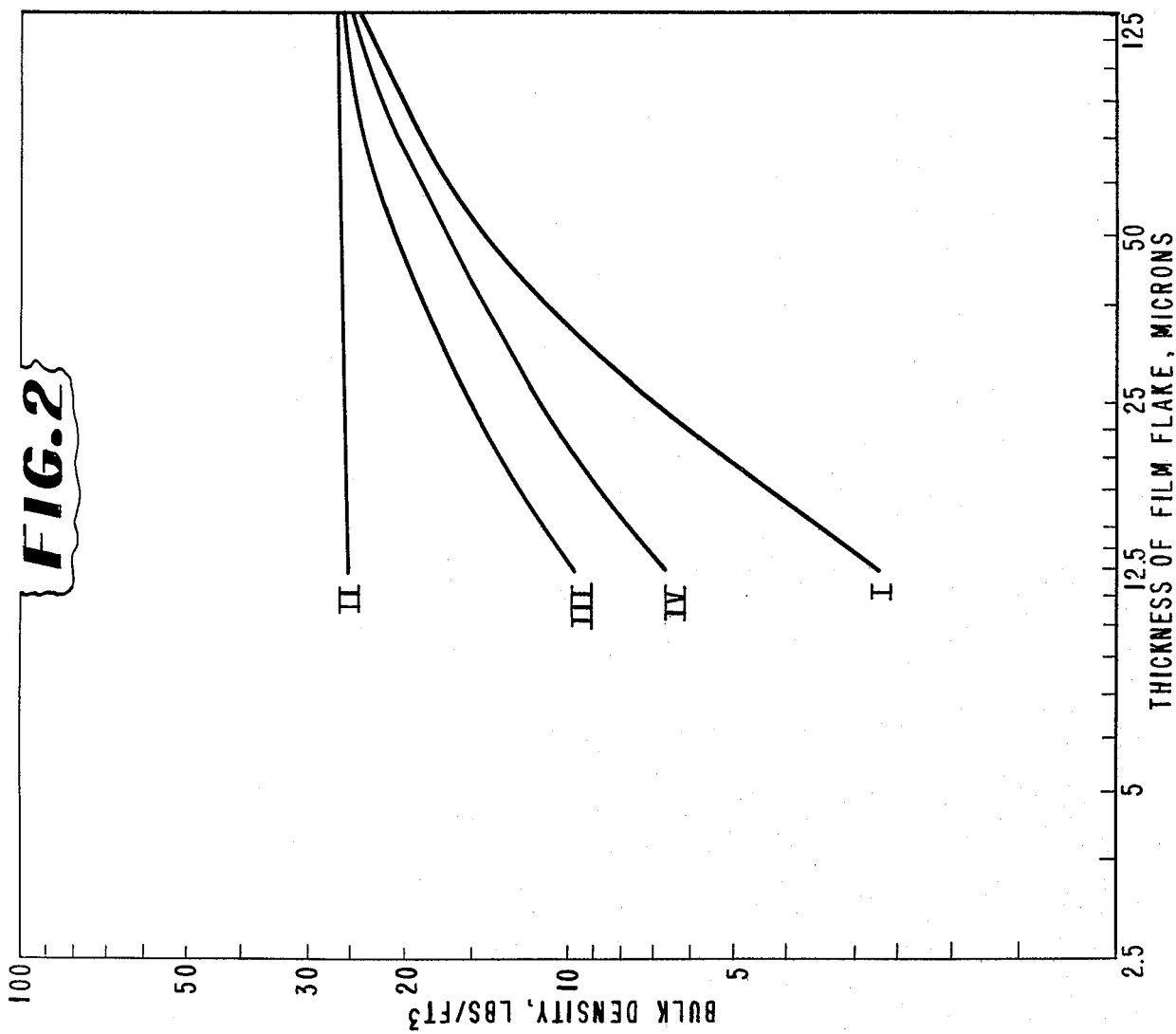
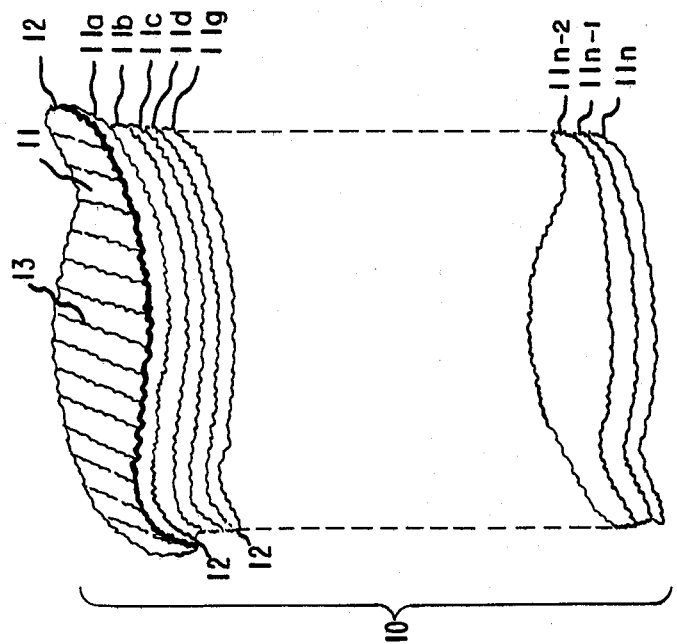

POROUS LAMINAR PELLETS OF WASTE POLY(ETHYLENE TEREPHTHALATE) FILM, AND PROCESSES FOR DRYING AND POLYMERIZATION

CROSS-REFERENCE TO RELATED APPLICATION

This application is a continuation-in-part of application Ser. No. 577,848, filed May 15, 1975, now abandoned.

BACKGROUND OF THE INVENTION

This invention relates to laminar pellets of crystalline ethylene terephthalate polymer film and to improved processes for the solid-phase polymerization and drying of poly(ethylene terephthalate), and hereinafter PET, and more particularly relates to the solid-phase polymerization of PET waste materials.

Considerable quantities of waste are accumulated during the manufacture of PET film. For instance, startup waste, bead and slitter trim, and reject film may comprise up to 50% of a biaxially oriented, PET film production run. The industry has proposed a variety of methods for reclaiming or recycling these wastes to improve process economics.

Linear polyesters stored under atmospheric conditions for several days absorb up to 0.4% or more of their weight of water. Upon remelting such polymer for its recovery or reuse, this absorbed water can cause a loss of up to 20% of its initial intrinsic viscosity (i.e., a substantial loss in molecular weight). Accordingly, most commercially acceptable processes for recovery or reuse require that the polymer be dried or be further polymerized, or both, before melting to prevent the viscosity from falling to below acceptable levels for fiber of film formation.

Because the rate of drying and polymerization depends upon the rate of diffusion from the bulk of the polymer of volatile substances, specifically, absorbed water, and glycol and water liberated from the condensation reaction as the polyester is further polymerized, it has been the practice to grind the film or other polyester material to a fine state. Classically, in U.S. Pat. No. 2,503,251, Edwards et al., which teaches the necessity for drying to maintain viscosity upon melting, the polymer is ground to a fine powder. More recently, in U.S. Pat. No. 3,657,388, Schweitzer et al., it is taught to compress the polymer in a "powdery or very fine-grained" state into particles. Processes for converting the polymer into these finely divided states are costly in energy consumption and can cause unwanted side reactions to produce color and the like in polymers such as polyesters. The present invention avoids the foregoing and enables the conversion of low bulk density waste crystalline polyester film into a conveniently handled state, with a minimum sacrifice in rates of drying, of polymerization in the solid state, and of dissolution times in molten polymer and in hot glycol-monomer systems for glycolysis to monomer.

U.S. Pat. No. 3,767,601 to Knox discloses a promising method for reclaiming general-purpose PET film waste, typically having an intrinsic viscosity of about 0.50 to 0.56, by comminuting the waste to flake form and then subjecting the flske to solid-phase polymerization, in the presence of a scavenging gas, to increase the PET intrinsic viscosity. The resulting waste can be reprocessed by melt extrusion to make products requiring the properties associated with high molecular weight PET. For instance, reclaimed PET having an intrinsic viscosity of slightly above 0.70 can be used to make a heat-sealable, heat-shrinkable film.

It has been found, however, that thin-gauge PET flake has such a low bulk density, typically in the range of 2.5 to 5 pounds per cubic foot (40 to 80 kilograms per cubic meter), that an excessively large reactor or dryer is needed to achieve practical production levels. Moreover, the low bulk density may cause material handling problems which limit process throughput. For example, it is difficult to sufficiently agitate a large charge of low-density flake to achieve uniform exposure to a scavenging gas, such as in the rotary kiln of Knox or a low pressure environment, and the low-density flake may clog passageways or become entrained in the scavenging gas stream, thereby clogging venting ports through which the scavenging gas is discharged.

To overcome these problems, one might melt extrude the comminuted wastes into solid granules or pellets which would then be subjected to solid-phase polymerization. But the reaction rate is limited by the relatively slow diffusion of ethylene glycol and water by-products to the waste surface where they envolve. Consequently, the use of larger sized waste sacrifices reaction rate and, as a practical matter, increases the plant investment required to achieve a given production rate.

Thus, there is a need for an improved solid-phase polymerization process which will give polymerization rates attainable with finely divided PET wastes, but which will not present the practical problems associated therewith.

SUMMARY OF THE INVENTION

The present invention provides laminar pellets of waste PET film and a process for heat treating the pellets for the purposes of drying and solid-phase polymerization wherein the pellets are heated to a temperature from about 50° C. to below the melting point of the ethylene terephthalate polymer, most often from 140° to 250° C., while volatile substances are continuously removed. The waste PET is put into the form of binderless laminar pellets comprising mechanically interlocked PET flakes.

By "bulk density" is meant the density of an aggregate of discrete items such as flakes or pellets.

By "laminar" is meant that the individual particles which constitute the pellet have a high surface-to-volume ratio, such as flakes of film wastes.

In practicing the process of the invention, drying and polymerization rates can be attained approaching that of the flakes per se without experiencing the problems associated with processing flake material. The pellets have sufficient strength to withstand tumbling, mixing, or routine handling during the process without significant disintegration, and yet can be readily broken apart after drying or polymerization has been completed, if desired.

The process is particularly well suited for, and will hereinafter be described with respect to, drying and solid-phase polymerization of pellets prepared from waste.

BRIEF DESCRIPTION OF THE DRAWINGS

FIG. 1 is a representation of the porous, laminar pellet of the present invention.

FIG. 2 is a graph illustrating the relationship of the bulk density of film flake and the pellets of the present invention vs. the thickness of the film flake.

DETAILED DESCRIPTION OF THE INVENTION

Figure 3:
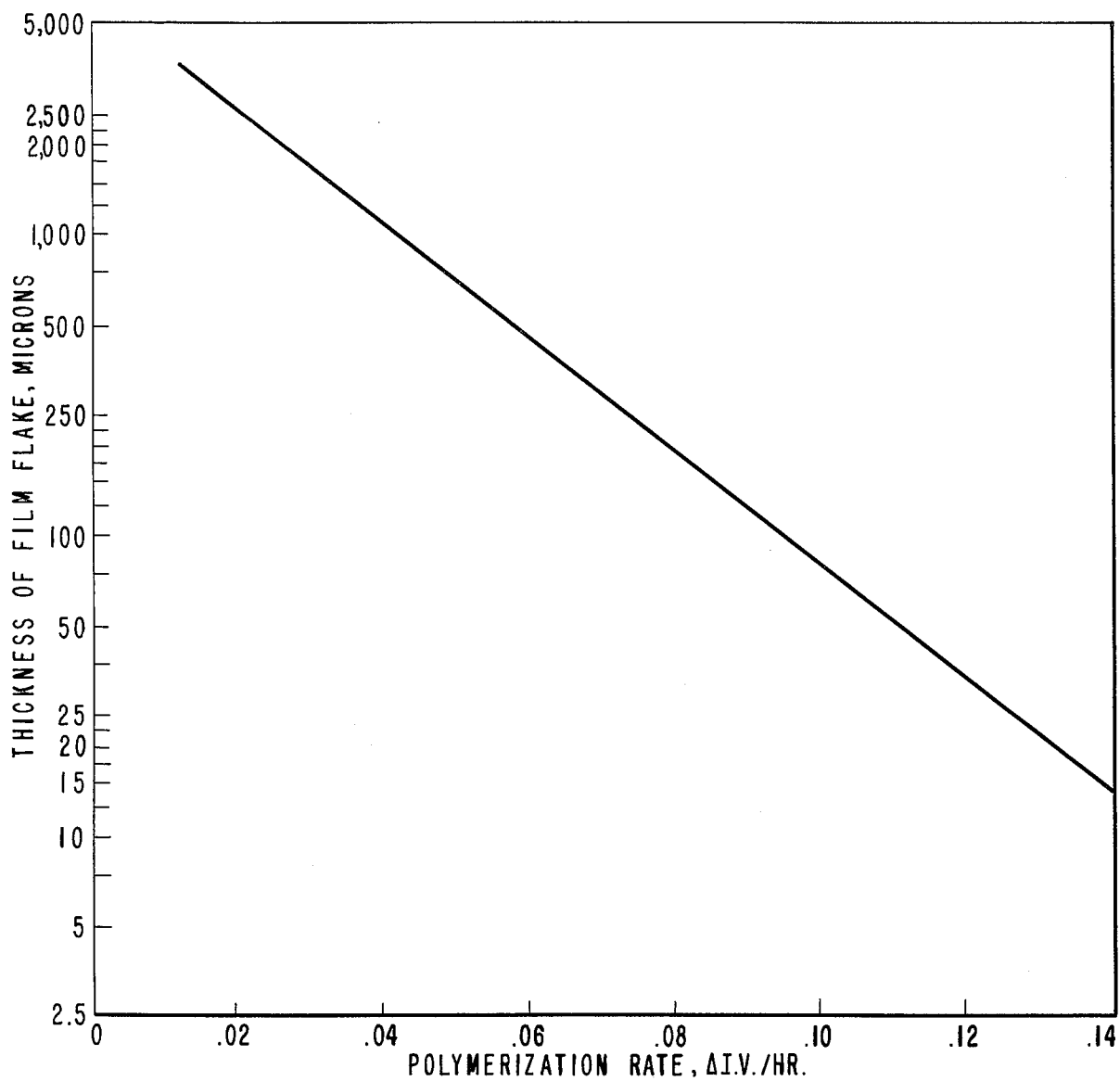
FIG. 3 is a graph illustrating the relationship between solid-phase polymerization rate and thickness of the PET film flake.

Pellets of the invention are laminar, and consist of mechanically interlocked PET flakes. The pellets do not contain a binder, which would introduce impurities restricting use of the solid-phase reaction product, but are internally interlocked so as to be sufficiently cohesive to withstand tumbling, etc., during a solid-phase polymerization process.

To make the pellets, at least partially crystalline (i.e., at least 25–30% crystalline) PET wastes collected during the manufacture of oriented film are shredded to a suitable flake size, such as by a rotary cutter, and then fed to a pellet mill. Flakes which range from about 1.5 mm. to 10 mm. long in each of the two planar dimensions are preferred for making the pellets. It has been found that PET flake passing a ⅜-inch (9.5 mm.) screen is particularly well suited for the preparation of pellets. This flake includes particles varying in shape from fiber-like strands to circular platelets. The pellets of the present invention are illustrated in FIG. 1. Pellet 10 is typically formed from a plurality of platelets, 11, 11a, 11b, 11c . . . 11n. The platelets are mechanically interlocked by slight crimps and crenulation 12 at the edges, and, in the thinner gauges, by mechanically binding contact on the surface by creping 13, which reduces interplanar slippage so that the pellets are not too readily friable.

While flake bulk density varies with the film thickness, bulk density of pellets prepared from the flake remains fairly constant. Typical bulk densities are reported in the following Table I for flake and pellets prepared from 0.25, 0.75 and 2.0 mil films.

TABLE I

| Film Thickness | | Bulk Density, lb./ft.$^3$ (kg./m.$^3$) | |
|---|---|---|---|
| mils | microns | Film Flake | Pellets |
| 0.25 | (6.4) | 1–1.1 (16–17.6) | ~25–27 (400–432) |
| 0.75 | (19) | 2.5–5 (40–80) | ~25–27 (400–432) |
| 2.0 | (50) | ~14 (~224) | ~25–27 (400–432) |

It is seen from Table I that the proportionate increase in bulk density achieved by pelletizing the flake decreases as film gauge increases. The relation of film gauge to bulk density is graphically shown in FIG. 2, wherein curve I shows this relationship for film flake from the shredder, and curve II for pellets of flake formed by a pelletizer. As a practical consideration, the increase in bulk density obtainable with film thicker than 5 mils (125 microns) is generally so slight that pelletizing of such wastes is not economically warranted.

Preferred pellet mills have a rotating or stationary perforated die ring, an internal chamber defined by the die ring, compression rollers arranged on the inner periphery of the die ring, and an adjustable rotary or stationary knife arranged at the outer periphery of the die ring. To make the pellets, flake of a crystallinity preferably of at least 25–30% is fed into the internal chamber of the pellet mill wherein the compression rollers force it outwardly through the die ring holes, where the knife cuts the compacted flake into pellets having the desired length. Suitable pellet mills of this design are well known in the art. Die rings with holes of diameter about 3/16-inch to ¼-inch (about 4 to 7 mm.) are preferred for making pellets of convenient size.

The work performed in the pellet mill, which mechanically interlocks the flakes by slight deformation during formation results in a temperature rise caused by friction between the individual flakes and between the flakes and walls of the die holes. The rise of temperature, if above about 180° C., will cause undesirable fusion between the individual flakes.

It has been found that pellets prepared from crystalline flake below about 180° C., and preferably within the range of 130° to 160° C., in such pellets mills have sufficient cohesive integrity to withstand physical handling during the solid-phase polymerization reaction yet may be easily crumbled thereafter, if desired. These pellets, typically having a diameter of about 2 to 7 mm. (about 0.1 to 0.25 inch) and a length of about 6 to 13 mm. (about .25 to 0.5 inch), are preferred since a significant degree of fusion between the flakes may reduce pellet porosity and increase the effective particle size, thereby reducing the solid-phase polymerization rate.

As noted in the previous paragraph, the pellets of the invention have sufficient integrity to survive handling in operations such as drying and solid-phase polymerization, yet can be easily broken apart again when desired. The latter can be accomplished by passing the pellets through fans in an air transport system. Referring again to FIG. 2, curve III shows the bulk density of pellets after one impact with fan blades, and curve IV shows the same after the third impact with fan blades, both as a function of the thickness of the film flakes from which the pellets are made.

In most situations it is desirable to avoid fusion between the flakes which constitute the pellet; however, in some instances, it may be desired to produce pellets with only a minor degree of fusion, capable of withstanding rough handling after completion of drying or a solid-phase polymerization reaction. In that case, a slight degree of fusion at the edges of the pellets can be introduced by preheating the flake, increasing the die hole length, or operating the pellet mill at slightly elevated temperatures. Accordingly, a granulating mill, such as that disclosed in U.S. Pat. No. 3,389,203 to Merges, which operates above the melting point of the polymer, cannot be satisfactorily employed. It will be understood that fusion decreases porosity of the particles and reduces the solid-phase polymerization and drying rates.

The solid-phase polymerization reaction is conducted by feeding the PET waste pellets continuously, or more preferably as a batch, into a suitable air-tight reaction vessel maintained at about 175° to 250° C., preferably no greater than 220° C. The pellets are maintained in the vessel for about 4 to 10 hours until the PET has attained the desired molecular weight increase. During the reaction, the reaction by-products, which include ethylene glycol and water, are continuously removed to drive the reaction. The reaction by-products are conveniently removed by passing a dry, inert scavenger gas stream, such as nitrogen or argon, through the reaction chamber or, more preferably, by maintaining the reaction in a vacuum, typically a pressure level of 3 mm. Hg or less.

The PET pellets are continuously agitated during drying or solid-phase polymerization processes in order to uniformly expose the reactor charge to the scavenging gas or vacuum. A rotary kiln, tumbling dryer, or similar equipment may be employed to advantage.

FIG. 3 is a graph correlating PET flake polymerization rate (on the abscissa) to the thickness of the flakes from which the pellets are formed (on the ordinate) for solid-phase polymerization reactions conducted at 220° C. under vacuum at a pressure of 0.01 to 1 mm. Hg, which are typical reaction conditions. The "polymerization rate", plotted on the abscissa is a measure of the change in polymer intrinsic viscosity per hour ($\Delta$I.V./hr.), with intrinsic viscosity being measured in grams per deciliter in a 40/60 parts by weight solution of tetrachloroethane/phenol at 25° C. as described in U.S. Pat. No. 3,627,579 which discloses determination of intrinsic viscosity from single values of relative viscosity. The ordinate is a logarithmic plot of flake thickness from 0.1 to 200 mils (2.5 to 5000 microns). The film thickness from which the pellets are formed controls the rate at which ethylene glycol and water can diffuse from the pellet.

From FIG. 3, it is readily seen that the PET flake polymerization rate decreases as flake thickness increases. When employing the pellets described hereinbefore, however, the polymerization rate does not depend on the pellet dimensions, as it would with solid pellets. Rather, the pellets are sufficiently porous that the polymerization rate may approach that of the individual flakes, especially when the preferred, nonfused pellets are employed. For instance, typical pellets have a polymerization rate within 0.015 intrinsic viscosity units per hour of that exhibited by the nonpelletized flake.

The pellets have particular utility for increasing the intrinsic viscosity of thin-gauge film, such as 0.08 to 2 mil (2 to 50 microns) film, but can also be employed to advantage with thicker film waste. In a typical case, the process will be employed to increase the intrinsic viscosity of waste film from a value of about 0.50 to 0.60 to a value of about 0.65 to 1.0, or higher, depending on the desired end use. For instance, the intrinsic viscosity can be increased to slightly above 0.65 where the waste is to be reextruded and uniaxially stretched for use as a strapping film, to slightly above 0.70 where the waste is to be reextruded and biaxially stretched for use as a heat-shrinkable, heat-sealable film, or to slightly above 0.82 where the film is to be reextruded and biaxially stretched for use as a film having high pinhole flex resistance. When the wastes are to be added to virgin PET, the process can be employed to compensate for decreases in intrinsic viscosity which occurred during original manufacture of the wastes.

As used herein, the term "poly(ethylene terephthalate)", PET, means a polymer having the same structure as that produced by the polyesterification of ethylene glycol and terephthalic acid. It is believed that this invention is equally applicable to those polyesters and copolyesters similar in structure to PET which are capable of reclamation by solid-phase polymerization, such as homopolymers and copolymers of aromatic dicarboxylic acids, such as terephthalic acid, isophthalic acid, bibenzoic acid, and naphthalene dicarboxylic acids, especially the —2,6—; —2,7— and —1,5— isomers, with $C_1$ to $C_{10}$ glycols, such as ethylene glycol, tetramethylene glycol, and cyclohexanedimethanol. The film should be at least slightly crystalline, preferably at least about 25–30% to avoid sticking and agglomeration.

EXAMPLE

A. Seventy-five gauge PET film (0.75 mil, 19 microns) having an intrinsic viscosity of about 0.55 was chipped by a 24-inch (60 cm.) Sprout-Waldron chipper equipped with a ⅜-inch (9.5 mm.) screen. The rotor was operated at 1200 rpm, and 1700 cfm (4.8 cubic meters per minute) air was used through the screen. The throughput rate was 1300 pounds per hour (590 kilograms per hour) and the resulting flake bulk density was 4.8 pounds per cubic foot (76 kilograms per cubic meter).

A 3.5-cubic foot (16.8 lbs., 7.6 kg.) charge of the flake was fed to a Patterson Kelly tumble vacuum dryer. The dryer was then heated to 220° C. under vacuum, at a pressure of 0.01 to 0.5 mm. Hg, absolute, and the flake was kept in the dryer for 4 hours after it reached the dryer temperature. The resulting flake had an intrinsic viscosity of 0.99. By computation, the polymerization rate was 0.11 intrinsic viscosity units per hour.

B. A portion of the PET flake from the Sprout-Waldron chipper was fed to a Model CMFB California Pellet Mill equipped with a die having 1300 3/16-inch (4.75 mm.) diameter holes ¼-inch (6 mm.) long. The mill operated at 441 pounds per hour (200 kilograms per hour) and produced 3/16-inch (4.75 mm.) diameter pellets having a length of ½-inch (12.7 mm.) at 135° C. The pellets readily feed out from a storage bin, and have significantly less tendency to clog passageways and venting ports than does the flake from which the pellets were made.

A 3.5-cubic foot (91 lbs., 41 kg.) charge of the pellets was fed to a Patterson Kelly tumble vacuum dryer. The dryer was then heated to 220° C. under vacuum, at a pressure of 0.01 to 0.5 mm. Hg, absolute, and the pellets were kept in the dryer for 4 hours after reaching dryer temperature. Resulting pellets had an intrinsic viscosity of 0.95. By computation, the polymerization rate was 0.10, which compares favorably with the polymerization rate for flake reported in part A. The pellets remained substantially intact.

C. Polymerized pellets of part B were processed through a conveying blower. The bulk density was decreased to 14 pounds per cubic foot (224 kilograms per cubic meter). After subsequent passes through the blower, the bulk density fell to 9.0 pounds per cubic foot (144 kilograms per cubic meter). The decrease in bulk density illustrated that the pellets can be readily broken apart, if desired, after completion of the solid-phase polymerization, by passage through fans, as shown in FIG. 2.

The example illustrates that the pellet polymerization rate is comparable to that of the flake. Both the flake and pellet polymerization rates were slightly below that predicted by the graph, evidently because of poor temperature control of the dryer.

Drying, which normally precedes other processes as mentioned earlier herein, can be carried out either as a separate operation or integrated with the process of solid-state polymerization, but at somewhat lower temperature. Generally, it can be integrated with solid-phase polymerization, wherein drying is conducted at temperatures of up to about 140° C. in a dry inert atmosphere at a pressure of 100 mm. Hg or less, or with a stream of a dry, heated inert scavenging gas, such as air of nitrogen. The second stage, polymerization, preferably employs temperatures of the order of 200° to 220° C., but oxygen, as in air, should be excluded.

Table II illustrates typical drying times for film flakes of various thicknesses, and pellets of two types.

TABLE II

Times to dry PET from 0.30% $H_2O$ to 0.01% $H_2O$ at 140° C. in dry nitrogen stream

| Thickness (microns) | Time (minutes) |
| --- | --- |
| 13 | 2 |
| 25 | 3 |
| 50 | 4 |
| 250 | 9.3 |
| 750 | 13.4 |
| Solid Pellets[1] | 45 |
| Compacted Pellets[2] | 9 |

[1]The solid pellets were substantially cylindrical, formed from molten PET extruded rods ⅛-inch diameter, ⅛-inch long (3 mm. by 3 mm.).
[2]The compacted pellets were of film 38 microns thick, and formed according to the present invention.

I claim:

1. A pellet consisting of a plurality of flakes of a crystalline ethylene terephthalate polymer, the flakes being crenulated and in laminar configuration with adjacent flakes being mechanically interlocked at flake edges.

2. The pellet of claim 1 wherein the flakes are 1.5 to 10 mm long in each of the two planar dimensions of the flake, and the pellet has a diameter of 2 to 7 mm and a length of 6 to 13 mm.

3. The pellet of claim 2 wherein the flakes are, at most, 0.125 mm thick.

4. The pellet of claim 2 wherein the flakes are 0.002 to 0.050 mm thick.

5. The pellet of claim 1 wherein the ethylene terephthalate polymer has an intrinsic viscosity of 0.5 to 0.6.

* * * * *

UNITED STATES PATENT OFFICE
CERTIFICATE OF CORRECTION

PATENT NO. : 4,092,458

DATED : May 30, 1978

INVENTOR(S) : FRANK EDWARD HOFFMAN

It is certified that error appears in the above-identified patent and that said Letters Patent are hereby corrected as shown below:

Col. 1, line 17, delete "and".

Col. 1, line 37, delete "of" and substitute -- or -- therefor.

Col. 1, line 65, delete "flske" and substitute -- flake -- therefor.

Col. 2, line 5, "howewer" should be -- however --.

Col. 2, line 25, delete "envolve" and substitute -- evolve --.

Col. 4, line 13, "pellets" should be -- pellet --.

Col. 4, line 32, the period "." should be -- , --.

Col. 6, line 66, delete "of" and substitute -- or --.

Signed and Sealed this

Twenty-third Day of January 1979

[SEAL]

Attest:

RUTH C. MASON
Attesting Officer

DONALD W. BANNER
Commissioner of Patents and Trademarks